United States Patent
Zou

(10) Patent No.: US 10,946,282 B2
(45) Date of Patent: Mar. 16, 2021

(54) CONTROL OBJECT SPATIAL LOCATION DETERMINING METHOD AND APPARATUS

(71) Applicant: TENCENT TECHNOLOGY (SHENZHEN) COMPANY LIMITED, Shenzhen (CN)

(72) Inventor: Ming Zou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 304 days.

(21) Appl. No.: 15/987,399

(22) Filed: May 23, 2018

(65) Prior Publication Data

US 2018/0264364 A1    Sep. 20, 2018

Related U.S. Application Data

(63) Continuation of application No. PCT/CN2017/072435, filed on Jan. 24, 2017.

(30) Foreign Application Priority Data

Feb. 5, 2016   (CN) .......................... 201610082767.2

(51) Int. Cl.
*A63F 13/577*   (2014.01)
*A63F 13/35*   (2014.01)
(Continued)

(52) U.S. Cl.
CPC ............ *A63F 13/577* (2014.09); *A63F 13/35* (2014.09); *A63F 13/56* (2014.09); *A63F 13/822* (2014.09)

(58) Field of Classification Search
CPC ................................ A63F 13/577; A63F 13/56
(Continued)

(56) References Cited

U.S. PATENT DOCUMENTS

2004/0248631 A1* 12/2004 Hirai ..................... A63F 13/812
463/4
2007/0206003 A1    9/2007 Yoshida et al.
(Continued)

FOREIGN PATENT DOCUMENTS

CN          101615301 A      12/2009
CN          102136025 A       7/2011
(Continued)

OTHER PUBLICATIONS

Korean Intellectual Property Office (KIPO) Office Action 1 for 20187017017 and Translation dated Sep. 17, 2019 10 Pages.
(Continued)

*Primary Examiner* — Samantha (Yuehan) Wang
(74) *Attorney, Agent, or Firm* — Anova Law Group, PLLC

(57) ABSTRACT

The present disclosure discloses a control-object spatial-location determining method and apparatus. The method includes: detecting, by a game engine of the game application, a spatial-location request, wherein the game engine is not applying physical collision, and the spatial-location request is a request for determining, based on a first spatial-location of a first control-object in the game application, a second spatial-location of a second control-object; determining, by the game engine, multiple candidate spatial-locations according to the first spatial-location of the first control-object, wherein the multiple candidate spatial-locations surround the first spatial-location, and any two of the multiple candidate spatial-locations and the first spatial-location do not overlap; and determining, by the game engine, an unoccupied candidate spatial-location among the multiple candidate spatial-locations as the second spatial-location of the second control-object.

17 Claims, 7 Drawing Sheets

(51) Int. Cl.
*A63F 13/822* (2014.01)
*A63F 13/56* (2014.01)
(58) Field of Classification Search
USPC .......................................................... 345/501
See application file for complete search history.

(56) References Cited

U.S. PATENT DOCUMENTS

| | | | | |
|---|---|---|---|---|
| 2009/0089694 A1* | 4/2009 | Mori | ................... | A63F 13/10 |
| | | | | 715/764 |
| 2010/0022301 A1* | 1/2010 | Carpenter | ............... | A63F 13/58 |
| | | | | 463/30 |
| 2014/0073435 A1* | 3/2014 | Liu | ................... | A63F 13/577 |
| | | | | 463/42 |
| 2018/0122129 A1* | 5/2018 | Peterson | ............. | H04N 13/366 |

FOREIGN PATENT DOCUMENTS

| | | |
|---|---|---|
| CN | 102160081 A | 8/2011 |
| CN | 103593546 A | 2/2014 |
| CN | 103957224 A | 7/2014 |
| CN | 105848742 A | 8/2016 |
| JP | 2005095439 A | 4/2005 |
| JP | 2007229204 A | 9/2007 |
| JP | 2007233511 A | 9/2007 |
| JP | 2009233098 A | 10/2009 |
| JP | 2015515304 A | 5/2015 |
| KR | 20140121901 A | 10/2014 |

OTHER PUBLICATIONS

The World Intellectual Property Organization (WIPO) International Search Report for PCT/CN2017/072435 dated May 2, 2017 6 Pages (including translation).
The State Intellectual Property Office of the People's Republic of China (SIPO) Office Action 1 for 201610082767.2 dated Apr. 13, 2018 9 Pages (including translation).
The Japan Patent Office (JPO) Notification of Reasons for Refusal for Application No. 2018-533828 and Translation dated Aug. 19, 2019 6 Pages.

* cited by examiner

CONTROL OBJECT SPATIAL LOCATION DETERMINING METHOD AND APPARATUS

RELATED APPLICATIONS

This application is a continuation application of PCT Patent Application No. PCT/CN2017/072435, filed on Jan. 24, 2017, which claims priority to Chinese Patent Application No. 201610082767.2, filed with the Chinese Patent Office on Feb. 5, 2016 and entitled "CONTROL OBJECT SPATIAL LOCATION DETERMINING METHOD AND APPARATUS", all of which are incorporated herein by reference in entirety.

FIELD OF THE TECHNOLOGY

This application relates to the field of computer technology and, specifically, to a method for determining control-object spatial location and apparatus thereof.

BACKGROUND OF THE DISCLOSURE

With existing technology, in an online game application, generally there are multiple non-player characters (NPCs) attacking a same target at the same time. The NPCs occupy their positions around the target, and the position-occupying mechanism in which the artificial intelligence (AI) of the multiple NPCs attack the same target (e.g., a player character) at the same time in an online game is referred to as an AI encirclement mechanism. In a current game engine, implementations of the AI encirclement mechanism are classified into two types according to whether the game engine applies physical collision:

(1) Game engines applying physical collision: a console game (such as StarCraft or Warcraft), an online game (such as Xuanyuan Legend), or the like. The characteristic of this game is that all bodies (for example, the foregoing character objects such as the NPCs) in the game cannot overlap in space. Therefore, in this type of game application, when AI of multiple NPCs attack a same target, the multiple NPCs move to positions that are relatively close to the target but not overlapped with one another.

(2) Game engines not applying physical collision: most game applications do not have physical collision engines, and the characteristic of this type of game is that bodies in a game may overlap in space. In the schematic diagram shown in FIG. 1, on a game interface, four NPCs (an NPC 1, an NPC 2, an NPC 3, and an NPC 4 in FIG. 1) are attacking a same target (such as a target object M1 in FIG. 1), and three NPCs (i.e., the NPC 1, the NPC 2, and the NPC 3) of the four NPCs in FIG. 1 are overlapped spatially. Because there is no physical collision, for an NPC, the entire space in a game scene may be occupied. Therefore, all NPCs may select a same position occupying point and may stack together. Thus, the experience of a player is often not realistic.

SUMMARY

Embodiments of this disclosure provide a control-object spatial location determining method and apparatus, so as to resolve at least the technical problem that, in a game engine without physical collision, solutions for making multiple bodies not overlap at a spatial location often have low operational efficiency.

According to an aspect of the present disclosure, a control-object spatial location determining method for a game application is provided. The method includes: detecting, by a game engine of the game application, a spatial-location request, wherein the game engine is not applying physical collision, and the spatial-location request is a request for determining, based on a first spatial-location of a first control-object in the game application, a second spatial-location of a second control-object; determining, by the game engine, multiple candidate spatial-locations according to the first spatial-location of the first control-object, wherein the multiple candidate spatial-locations surround the first spatial-location, and any two of the multiple candidate spatial-locations and the first spatial-location do not overlap; and determining, by the game engine, an unoccupied candidate spatial-location among the multiple candidate spatial-locations as the second spatial-location of the second control-object.

According to another aspect of the present disclosure, a control-object spatial location determining apparatus for a game application is provided. The apparatus includes a processor and a memory, and the memory stores a computer readable instruction, which enables the processor to perform the following operations: detecting a spatial-location request, wherein the game application is not applying physical collision, and the spatial-location request is a request for determining, based on a first spatial-location of a first control-object in the game application, a second spatial-location of a second control-object; determining multiple candidate spatial-locations according to the first spatial-location of the first control-object, wherein the multiple candidate spatial-locations surround the first spatial-location, and any two of the multiple candidate spatial-locations and the first spatial-location do not overlap; and determining an unoccupied candidate spatial-location among the multiple candidate spatial-locations as the second spatial-location of the second control-object.

According to another aspect of the present disclosure, a non-transitory computer-readable storage medium is provided. The non-transitory computer-readable storage medium contains computer-executable instructions for, when executed by one or more processors, performing a control-object spatial-location determining method for a game application. The method includes: detecting a spatial-location request, wherein the game application is not applying physical collision, and the spatial-location request is a request for determining, based on a first spatial-location of a first control-object in the game application, a second spatial-location of a second control-object; determining multiple candidate spatial-locations according to the first spatial-location of the first control-object, wherein the multiple candidate spatial-locations surround the first spatial-location, and any two of the multiple candidate spatial-locations and the first spatial-location do not overlap; and determining an unoccupied candidate spatial-location among the multiple candidate spatial-locations as the second spatial-location of the second control-object.

Other aspects of the present disclosure can be understood by those skilled in the art in light of the description, the claims, and the drawings of the present disclosure.

BRIEF DESCRIPTION OF THE DRAWINGS

The accompanying drawings described herein are used to provide further understanding about this application, and form a portion of this application. Schematic embodiments of this application and descriptions about the exemplary embodiments are used to construe this application, and do not constitute an inappropriate limitation on this application. In the figures.

DETAILED DESCRIPTION

Figure 1:
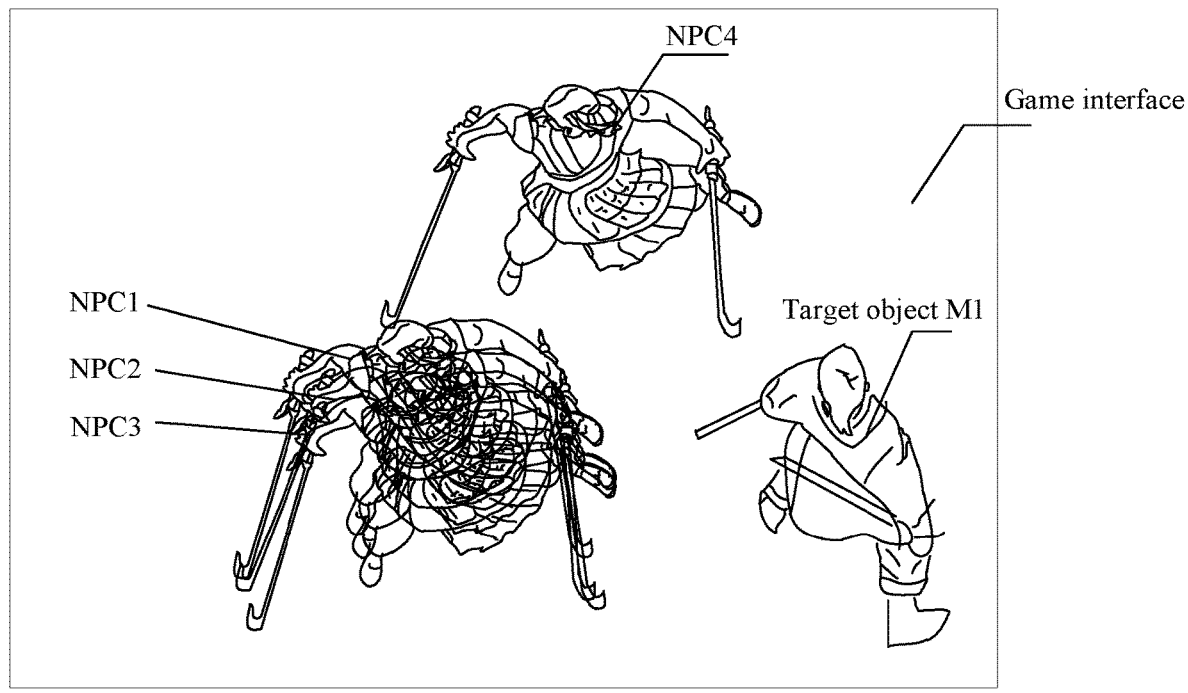
FIG. 1 illustrates a schematic diagram of spatial-locations of bodies in an online game.

To make the solutions of the present disclosure more comprehensible for persons skilled in the art, the following describes the technical solutions in the embodiments of the present disclosure with reference to the accompanying drawings. Apparently, the described embodiments are merely a part rather than all of the embodiments of the present disclosure. Other embodiments obtained by persons skilled in the art based on the embodiments of the present disclosure without creative efforts shall fall within the protection scope of the present disclosure.

It should be noted that, the terms such as "first" and "second" in the specification and claims of the present disclosure and the accompanying drawings may be used to distinguish similar objects, but are not necessarily used to describe a specific sequence or a precedence level. It should be understood that, data used in this way may be interchanged in a proper circumstance, so that the embodiments of the present disclosure described herein can be implemented in a sequence different from those shown in the drawings or described herein. In addition, terms "include" and "have" and any variation thereof are intended to cover nonexclusive inclusion. For example, a process, method, system, product, or device including a series of steps or units are not limited to those clearly listed steps or units, but may include another step or unit that is not clearly listed or is inherent for the process, method, product or device.

According to an embodiment of the present disclosure, an embodiment of a control-object spatial-location determining method is provided. It should be noted that, the steps shown in a flowchart of the accompanying drawing may be performed, for example, in a computer system with a group of computer executable instructions. In addition, although a logical sequence is shown in the flowchart, the shown or described steps may be performed in a sequence different from the sequence herein in some cases.

Figure 2:
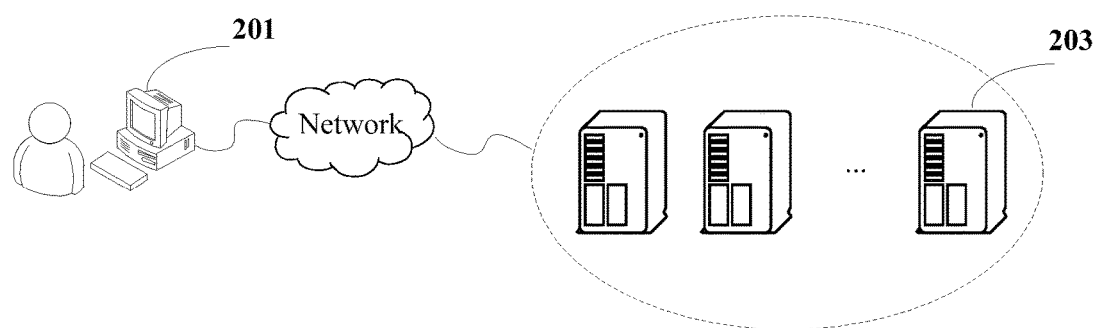
FIG. 2 illustrates a schematic diagram of a computer network environment according to an embodiment of the present disclosure.

In some embodiments, the foregoing control-object spatial-location determining method may be applied to the network environment shown in FIG. 2. The network environment includes a terminal 201 and a server 203. The terminal establishes a connection to the server by using a network, and a processor may be disposed in both the terminal and the server.

The network includes but not limited to a wide area network, a metropolitan area network or a local area network. In some embodiments, the network is a local area network; the terminal may include a personal computer, or a mobile terminal (such as a mobile phone or a tablet computer).

Figure 3:
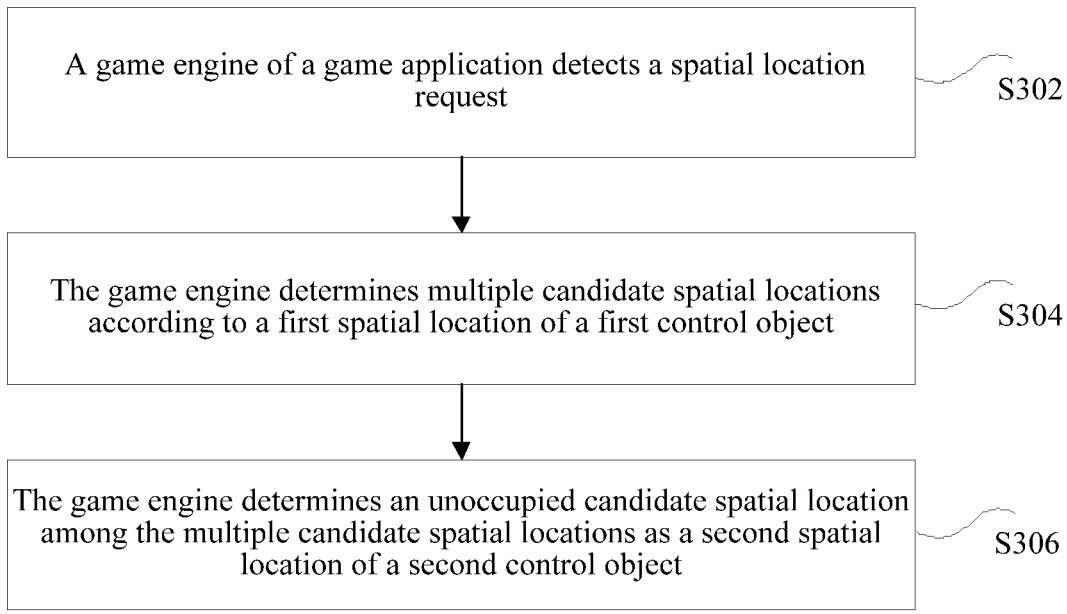
FIG. 3 illustrates a flowchart of a control-object spatial-location determining method according to an embodiment of the present disclosure.

FIG. 3 shows a control-object spatial-location determining method according to an embodiment of the present disclosure. As shown in FIG. 3, the method includes the followings.

S302: A game engine of a game application detects a spatial-location request, where the spatial-location request is used for requesting a determination of a second spatial-location of a second control-object according to a first spatial-location of a first control-object in the game application, and the game engine is an engine without physical collision, that is, control-objects in the game application are allowed to overlap at a same spatial-location.

S304: The game engine determines multiple candidate spatial-locations according to the first spatial-location of the first control-object, where the multiple candidate spatial-locations surround the first spatial-location, and any two of the multiple candidate spatial-locations and the first spatial-location do not overlap.

S306: The game engine determines an unoccupied candidate spatial-location among the multiple candidate spatial-locations as the second spatial-location of the second control-object.

After the second spatial-location is determined, a notification containing information about the second spatial-location is generated. After receiving the notification, the AI (such as an artificial intelligence control unit) of the second control-object moves the second control-object to the second spatial-location.

Accordingly, for the game engine without a condition of physical collision in this embodiment of the present disclosure, after a spatial-location request is detected, multiple candidate spatial-locations are determined according to a first spatial-location of a first control-object, and an unoccupied candidate spatial-location among the multiple candidate spatial-locations is determined as a second spatial-location of a second control-object. The multiple candidate spatial-locations in the foregoing embodiment surround the first spatial-location, and the any two of the multiple candidate spatial-locations and the first spatial-location do not overlap. Therefore, the unoccupied location is selected from the multiple spatial-locations as the second spatial-location of the second control-object. If there are multiple second control-objects, locations of the multiple second control-objects do not overlap. Thus, even without a game engine with physical collision, which may require high research and development costs and low running efficiency, spatial-locations that do not overlap may be allocated for multiple second control-objects in a game engine without physical collision, resolving the problem that, in a game engine without physical collision, existing solutions for making multiple bodies not overlap at a spatial location often have low operational efficiency.

Both the first control-object and the second control-object in the foregoing embodiment may be game characters, or may be static objects in a game. The second control-object in the foregoing embodiment may be an object controlled by artificial intelligence, and the spatial-location request may also be generated by the artificial intelligence control unit of the second control-object. The foregoing method may be performed by an encirclement manager in a game engine.

For example, the first control-object may be a game player, the second control-object may be an NPC, and the game player may be a game character that is controlled by a user by entering an operation instruction when the user uses a game client.

Thus, according to the disclosed embodiments, without applying the physical collision, different spatial-locations can be allocated for multiple NPCs in a game application, and the spatial-locations of the NPCs are different from each other, so that AI can make location-occupying performance of the NPCs more realistic and vivid by using the encirclement mechanism.

Specifically, the game application may be an online game application; the user may use a game account number to log on to a game client installed on a terminal, and enter into a game scenario of the game application. After entering the game scenario, the game account number corresponds to one game character (that is, the first control-object in the foregoing embodiment) in the scenario. After receiving a start instruction from the game client of the terminal, the game engine starts a corresponding game in response to the start instruction.

After the game is started, whether an NPC appears in the game is detected. If the NPC appears, whether a spatial-location request is detected. If the spatial-location request is detected, multiple candidate spatial-locations that do not overlap each other and that correspond to a first spatial-location of a first control-object are determined, an unoccupied candidate spatial-location is selected from the multiple spatial-locations and determined as a second spatial-location of the NPC, that is, the unoccupied candidate spatial-location is allocated to the NPC, the NPC is notified of the second spatial-location allocated for the NPC, and the NPC moves to the second spatial-location.

In some embodiments, the game engine may alternatively directly move the NPC to the second spatial-location. This is not limiting in the present disclosure.

Further, a spatial-location that is already locked by one NPC will not be occupied by another NPC; when multiple NPCs encircle a target (i.e., the first control-object), the multiple NPCs do not overlap, and the game is made as realistic as possible, improving user experience.

Figure 4:
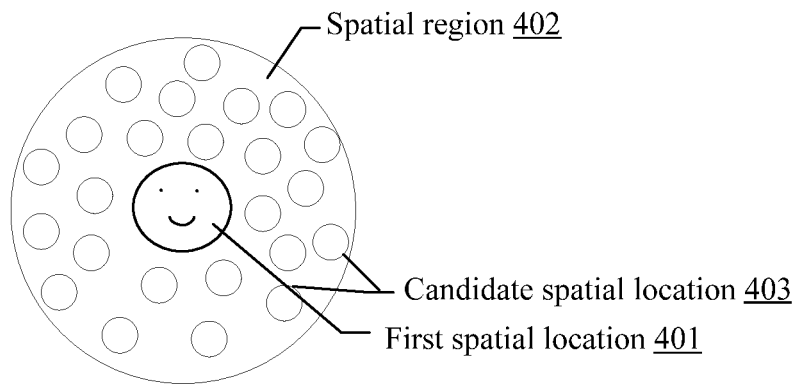
FIG. 4 illustrates a first schematic diagram of distribution of candidate spatial-locations according to an embodiment of the present disclosure.

FIG. 4 shows distribution of candidate spatial-locations. In one embodiment, the process of determining, by a game engine, multiple candidate spatial-locations according to a first spatial-location of a first control-object includes: determining multiple candidate spatial-locations in a spatial region with the first spatial-location as the center, where a distance between each of the candidate spatial-locations and the first spatial-location does not exceed a preset threshold.

As shown in FIG. 4, a circular spatial region 402 is determined by using the first spatial-location 401 as the center and the preset threshold as the radius. Multiple candidate spatial-locations 403 are randomly disposed in the circular spatial region. A distance between each of the candidate spatial-locations 403 and the first spatial-location 401 does not exceed the preset threshold, and the multiple candidate spatial-locations 403 surround the first spatial-location 401.

In the game application, the second control-object needs to perform an operation (such as encirclement or attacking) on the first control-object. Therefore, an encirclement or attacking function of a game may be implemented better if a distance between a candidate spatial-location and the first spatial-location is determined to be within a range of a preset distance.

In some embodiments, the determining the multiple candidate spatial-locations in a spatial region with the first spatial-location as the center may include: disposing, in the spatial region, the multiple candidate spatial-locations on an encirclement ring with the first spatial-location as the center.

Specifically, there are N encirclement rings, and the disposing the multiple candidate spatial-locations on an encirclement ring with the first spatial-location as the center includes: disposing one group of candidate spatial-locations on each of the N encirclement rings, where an $i^{th}$ group of candidate spatial-locations is disposed on an $i^{th}$ encirclement ring, N is an integer greater than or equal to 1, and i is a positive integer less than or equal to N.

N encirclement rings may be disposed by using the first spatial-location as the center of a circle. The radius of each encirclement ring is different. One group of candidate spatial-locations is disposed on each encirclement ring, that is, an $i^{th}$ group of candidate spatial-locations is disposed on an $i^{th}$ encirclement ring. In this way, randomness of disposing the candidate spatial-locations is reduced, and performance of a processor is improved. In addition, a distance between candidate spatial-locations on each encirclement ring is consistent, and a second spatial-location may be selected for the encirclement rings one after another. For example, a candidate spatial-location on a first encirclement ring is selected first, and if there is no proper location on the first encirclement ring, a location on a second encirclement ring is selected; other situations can be handled similarly. Compared with random disposition of candidate spatial-locations, in this solution, disposition of candidate spatial-locations complies with a rule, and so does selection of candidate spatial-locations, thereby increasing the processing speed.

Further, when the candidate spatial-locations are disposed, the $i^{th}$ group of candidate spatial-locations is evenly distributed on the $i^{th}$ encirclement ring, and the number of candidate spatial-locations in each group is different from each other.

Figure 5:
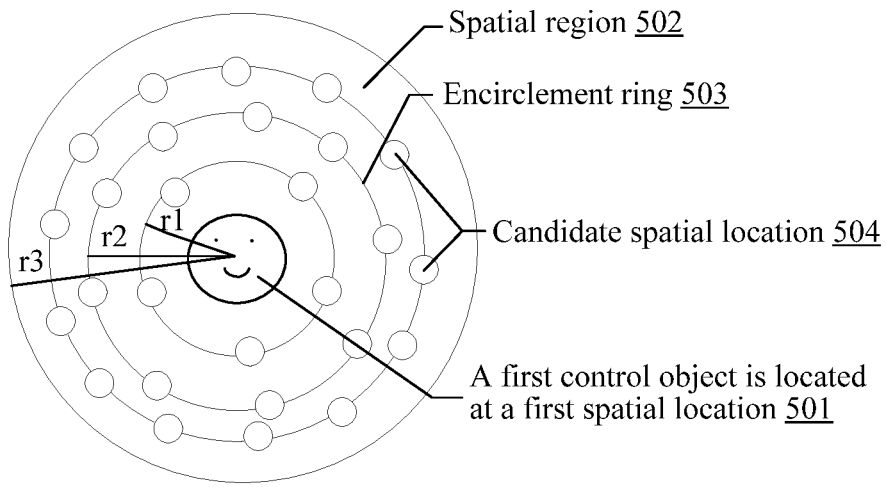
FIG. 5 illustrates a second schematic diagram of distribution of candidate spatial-locations according to an embodiment of the present disclosure.

As shown in FIG. 5, a first control-object is located at a first spatial-location 501, and within a determined spatial region 502, three encirclement rings 503 (the three encirclement rings are all identified with a label 503) may be disposed. The radii of the three encirclement rings 503 are respectively r1, r2, and r3. The radii of the three encirclement rings 503 are different from each other, one group of candidate spatial-locations 504 is disposed on each encirclement ring 503, and a quantity of candidate spatial-locations 504 in each group is different from each other. In FIG. 5, there are five candidate spatial-locations 504 in a first group, nine candidate spatial-locations 504 in a second group, and thirteen candidate spatial-locations 504 in a third group, and candidate spatial-locations 504 are evenly distributed on each encirclement ring 503.

It should be noted that, in the present disclosure, an encirclement ring is only a virtual concept, candidate spatial-locations may be set according to a radius distance, and the encirclement ring may not be used. That is, N groups of candidate spatial-locations are disposed according to different radius distances by using the first control-object as the center, and distances between candidate spatial-locations and the first control-object may be the same in each group.

In some embodiments, disposing multiple candidate spatial-locations on an encirclement ring with a first spatial-location as the center may include: setting at least one of the following according to attribute information of the first control-object and a second control-object: a distance between an $i^{th}$ encirclement ring and the first control-object, the number of candidate spatial-locations in an $i^{th}$ group, and a distribution manner of the $i^{th}$ group of candidate spatial-locations.

In one embodiment, a number of encirclement rings, a distance between each encirclement ring and the first control-object, a number of candidate spatial-locations in each group, and a distribution manner (such as even distribution or uneven distribution) of candidate spatial-locations may be determined according to attributes of the first control-object and the second control-object.

Figure 6:
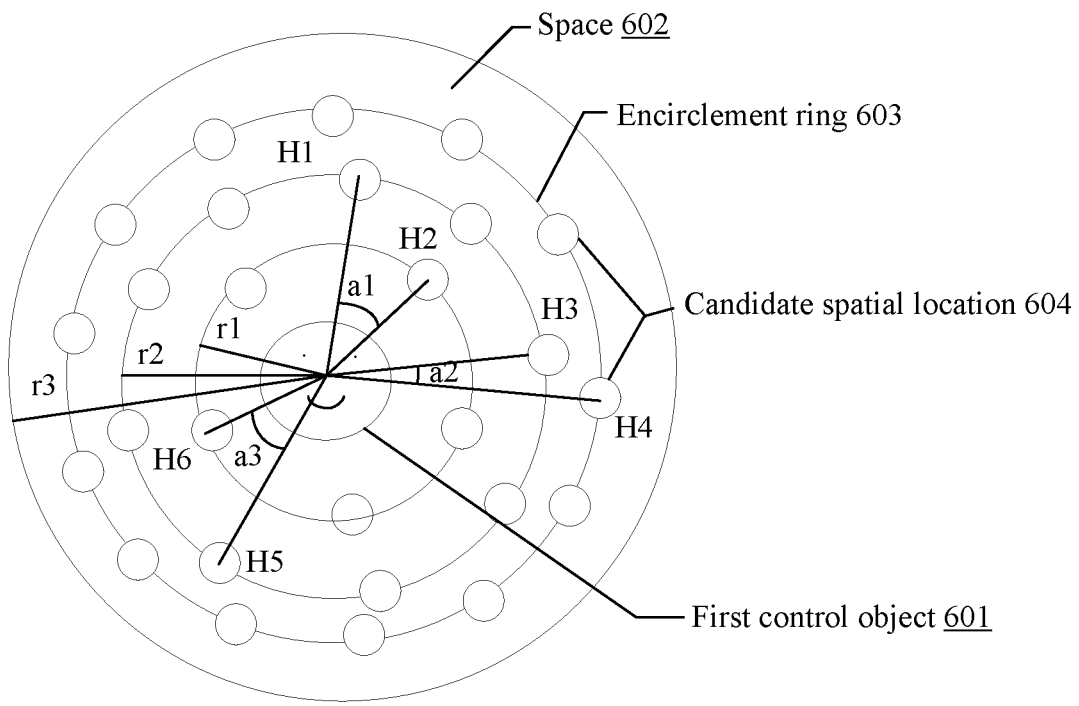
FIG. 6 illustrates a third schematic diagram of distribution of candidate spatial-locations according to an embodiment of the present disclosure.

To make multiple NPCs not overlap and as truthful as possible when the multiple NPCs encircle a same target, the candidate spatial-locations are referred to as a "formation" in the present disclosure. As shown in FIG. 6, a formation is a series of virtual points (that is, candidate spatial-locations) around a target (that is, a first control-object).

When candidate spatial-locations are distributed, a connection between each of the multiple candidate spatial-locations and a first spatial-location of the target object (that is, the first control-object) does not coincide with each other, so that an NPC object located at each candidate spatial-location may directly perform an operation on the target object, that is, each candidate spatial-location is disposed at a location at which an operation may be directly performed on the target object.

In some embodiments, each candidate spatial-location may be disposed according to an angle determined by using any two candidate spatial-locations and the first spatial-location. The angle uses the first spatial-location as the vertex, uses a connection line between one candidate spatial-location of the any two candidate spatial-locations and the vertex as one side, and uses a connection line between the other candidate spatial-location of the any two candidate spatial-locations and the vertex as the other side.

Specifically, space around the target object (e.g., the first control-object 601 shown in FIG. 6), such as space 602 shown in FIG. 6, also referred to as the spatial region, is first divided into N "encirclement rings" (for example, three encirclement rings 603 are shown in FIG. 6, and the three encirclement rings 603 may be three circles whose radii are respectively r1, r2, and r3) according to a distance from the target object. Further, an "encirclement point" (that is, a candidate spatial-location 604) is allocated at a proper angle on an encirclement ring. The proper angle may be self-defined based on a scenario of a game application, or may be set according to attributes of the target object and an NPC object. As shown in FIG. 6, the angle between H1 and H2, the angle between H3 and H4, and the angle between H5 and H6 are respectively a1, a2, and a3. Both a radius r of an encirclement ring and the number n of encirclement rings, the number of encirclement points on each encirclement ring (this variable may be alternatively determined by using an angle 'a' between the encirclement points) may be self-defined according to a service requirement. Similarly, a distribution manner of the encirclement points may not necessarily be a manner of an encirclement ring, and the encirclement points may be distributed in any shape.

Figure 7:
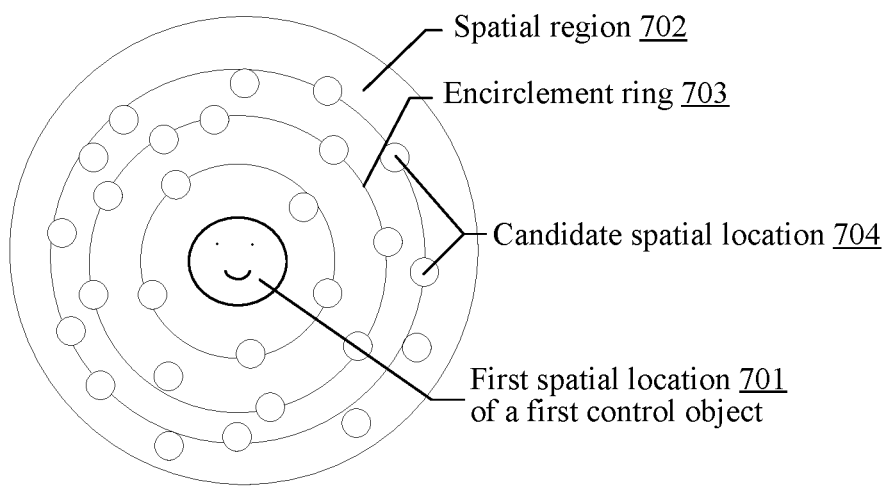
FIG. 7 illustrates a fourth schematic diagram of distribution of candidate spatial-locations according to an embodiment of the present disclosure.

It should be further noted that, to make an encirclement effect of multiple candidate spatial-locations more vivid, relative locations of the multiple candidate spatial-locations may be adjusted according to an offset vector. As shown in FIG. 7, a first control-object is located at a first spatial-location 701, and in a determined spatial region 702, three encirclement rings 703 (the three encirclement rings are all identified with a number 703) may be disposed. One group of candidate spatial-locations 704 is disposed on each of the encirclement rings 703, and some random offsets in distance and angle may be performed on relative locations of encirclement points (that is, the candidate spatial-locations 704) on each of the encirclement rings 703, producing an effect of unevenness. That is, after the adjustment, the distances between the encirclement rings and the first control-object may remain unchanged, and candidate spatial-locations on each encirclement ring are changed. In other words, the candidate spatial-locations are offset by a random amount within a certain range. Changed candidate spatial-locations may be not located on the encirclement ring any longer.

Thus, when the second spatial-location is determined, the second spatial-location may be selected according to a predefined priority selection manner, for example, a selection manner of first selecting the one whose distance is the shortest, or a selection manner of selecting the one whose distance from a neighboring candidate spatial-location is the largest. The predefined priority selection manner may be alternatively self-defined according to a service requirement. Generally, a principle for first selecting the one whose distance is the shortest may be complied with, that is, an encirclement point relatively close to the target object and closest to a current location of an NPC on an encirclement ring is allocated for the NPC (such as a monster).

That is, determining, by a game engine, an unoccupied candidate spatial-location among the multiple candidate spatial-locations as a second spatial-location of a second control-object may include: determining an unoccupied candidate spatial-location among the multiple candidate spatial-locations and closest to the first spatial-location as the second spatial-location of the second control-object.

Specifically, after the first spatial-location is determined, an encirclement ring closest to the first spatial-location is obtained, and an unoccupied candidate spatial-location is selected from the currently obtained encirclement ring. If all candidate spatial-locations on the currently obtained encirclement ring are occupied, a next closest encirclement ring is obtained, and so on, until the occupied encirclement ring is found.

In the foregoing embodiment, if there are several unoccupied candidate spatial-locations on a same encirclement ring, one of the unoccupied candidate spatial-locations may be randomly selected as the second spatial-location; or a location closest to the current location of the second control-object may be selected from the unoccupied candidate spatial-locations as the second spatial-location; or if the current location of the second control-object is empty (that is, the second control-object does not exist in the game space), random selection may be performed.

Further, each candidate spatial-location may have a status flag. The status flag is used for indicating whether the candidate spatial-location is occupied. That is, whether the corresponding candidate spatial-location is occupied may be determined according to the status flag. After the unoccupied candidate spatial-location among the multiple candidate spatial-locations and closest to the first spatial-location is determined as the second spatial-location of the second control-object, a status of the unoccupied candidate spatial-location among the multiple candidate spatial-locations and closest to the first spatial-location is changed to an occupied state.

After the second spatial-location is determined each time, the status of the determined second spatial-location is changed to the occupied state. Similarly, after an NPC disappears each time, a status of a spatial-location of the NPC that disappears is changed back to an unoccupied state again, so that when a spatial-location is selected next time, it can be ensured that the spatial-location of the second control-object is correctly determined.

Figure 8:
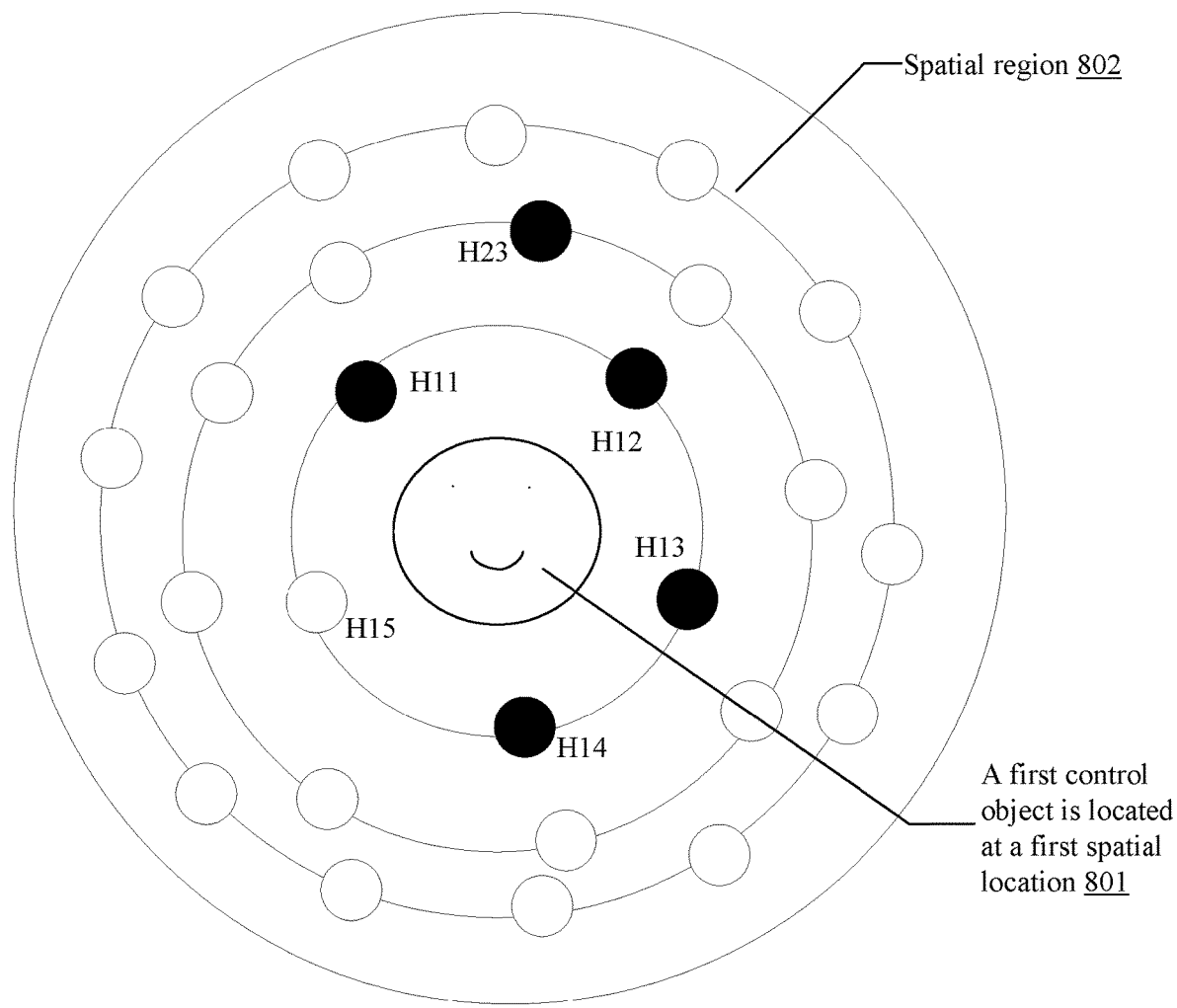
FIG. 8 illustrates a fifth schematic diagram of distribution of candidate spatial-locations according to an embodiment of the present disclosure.

As shown in FIG. 8, after a location determining request is detected, multiple candidate spatial-locations of a first spatial-location 801 of a first control-object are determined. In the embodiment shown in FIG. 8, in a spatial region 802, some of the determined candidate spatial-locations are already occupied. Black candidate spatial-locations in FIG. 8 indicate occupied candidate spatial-locations.

For example, H11, H12, H13, and H14 on a first encirclement ring in FIG. 8 are already occupied, and H23 on a second encirclement ring is already occupied. As previously described, an unoccupied candidate spatial-location H15 on the first encirclement ring may be selected, and H15 is determined as a second spatial-location. A game engine generates a notification carrying information about the second spatial-location, and sends the notification to a manual control unit of the second control-object. The manual control unit moves the second control-object to the second spatial-location, to perform an operation, such as attaching, on the first control-object.

Further, the detecting, by a game engine of a game application, a spatial-location request may include: determining that the spatial-location request is detected when receiving, by the game engine, an instruction of an operation performed by the second control-object on the first control-object; or determining that the spatial-location request is detected if it is detected that the first control-object moves to the first spatial-location and a distance between the first spatial-location and a third spatial-location exceeds a preset distance in a case in which the first control-object is located at the third spatial-location and the first control-object is surrounded by multiple second control-objects located at a fourth spatial-location.

In some embodiments, when the first control-object is located at the third spatial-location and the first control-object is surrounded by the multiple second control-objects located at the fourth spatial-location, the method further includes: if it is detected that the first control-object moves to the first spatial-location and the distance between the first spatial-location and the third spatial-location does not exceed the preset distance, determining a motion vector of the first control-object based on the first spatial-location and the third spatial-location; and translationally moving the second control-object from the second spatial-location to a fifth spatial-location according to the motion vector. That is, if a movement range of the first control-object is not large, the second control-object is translationally moved based on the movement of the first control-object, without a need to generate a spatial-location request again, so as to save resources.

In some embodiments, after a game function is started, when the second control-object attacks the first control-object, an operation instruction such as an attacking instruction or a siege instruction is generated, and a spatial-location request is generated. Then, the game engine can detect the spatial-location request. In some embodiments, if it is detected that an NPC generates the operation instruction, it is determined that the spatial-location request is detected.

In some embodiments, after a game function is started, the first control-object is located at a third spatial-location and the first control-object is surrounded by multiple second control-objects located at a fourth spatial-location; when the first control-object is in the foregoing state, if the game engine detects that a location of the first control-object moves to the first spatial-location and a range of the movement is very large. If a distance by which a third control location moves exceeds a preset distance range, an NPC generates a spatial-location request, to obtain a spatial-location of a PC again.

Figure 9:
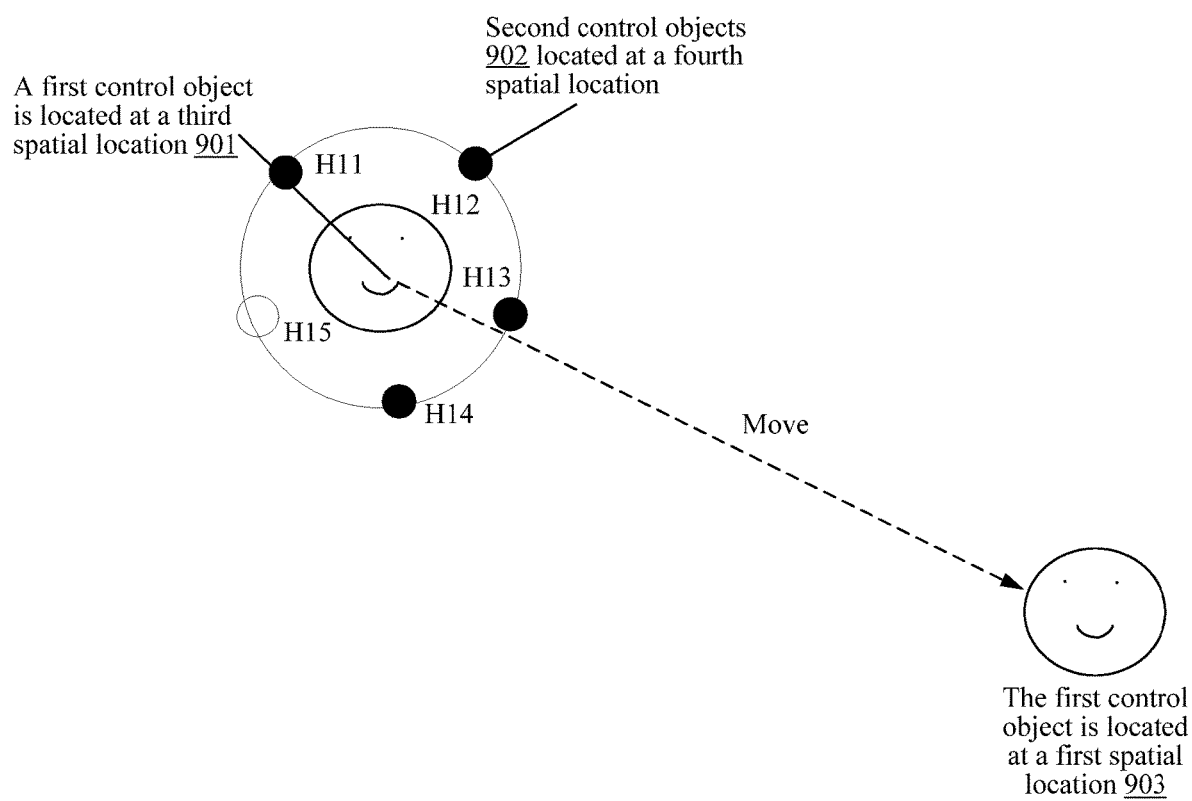
FIG. 9 illustrates a schematic diagram of a trigger condition for spatial-location request generation according to an embodiment of the present disclosure.

The following describes more details with reference to FIG. 9. When a first control-object is located at a third spatial-location 901, and three second control-objects 902 located at a fourth spatial-location surround a first control-object, if the first control-object moves and a distance by which the first control-object moves is large, as shown by a first spatial-location 903 of the first control-object in FIG. 9, AI of an NPC generates a spatial-location request, to apply for a spatial-location again.

When the NPC attacks the target, one encirclement point (that is, the second spatial-location) is applied for from multiple candidate spatial-locations and used as a location occupying point of the NPC, and a current state is recorded on the encirclement point. An encirclement point that is already locked by another NPC cannot be occupied by another NPC, as shown by the black candidate spatial-locations, and the remaining NPCs can be selected only from the remaining unoccupied encirclement points.

A priority algorithm for selecting an encirclement point may be alternatively self-defined according to a service requirement. Generally, a principle for first selecting the one whose distance is the shortest is complied with, that is, an encirclement point relatively close to the target and closest to a current location of a monster (that is, a second control-object) on an encirclement ring is allocated for the monster.

The encirclement target is not necessarily static, and when the target continuously moves, an entire "formation" continuously and translationally moves based on the target, that is, absolute coordinates of each encirclement point continuously change. Therefore, after the NPC obtains an encirclement point by means of applying, the AI needs to continuously determine current coordinates of the encirclement point, and if finding that the NPC deviates from the encirclement point by a relatively large margin, the AI initiates movement of the NPC to new coordinates. In addition, if one-off movement of the target causes deviation from original coordinates by a relatively large margin (such as the state shown in FIG. 9), resulting in a relatively large change of a relative location of the NPC in the encirclement, all encirclement points may be reset at the same time, so that the NPC initiates the applying process again.

Figure 10:
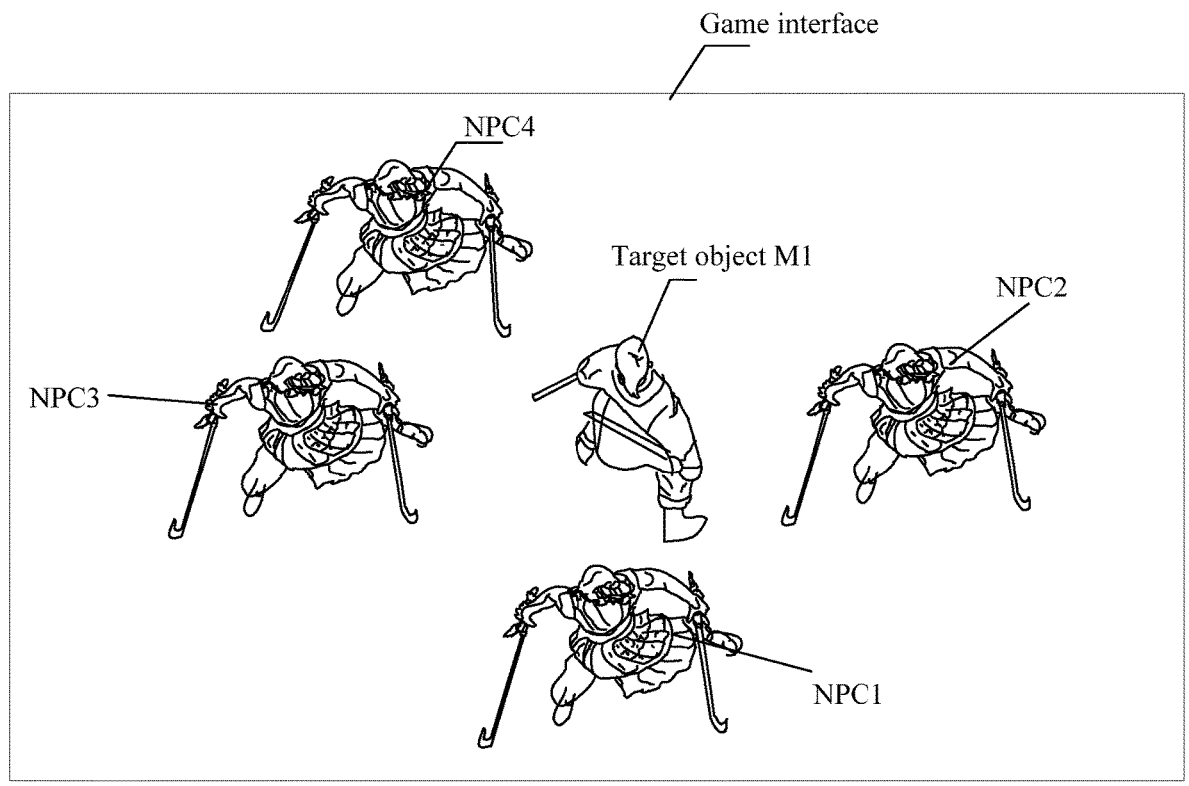
FIG. 10 illustrates a schematic diagram of a game interface generated by using a spatial-location determining method according to an embodiment of the present disclosure.

As shown in FIG. 10, if there are four second control-objects (an NPC1, an NPC2, an NPC3, and an NPC4) and one first control-object (that is, a target object M1) in the game scenario generated in the disclosed embodiments of the present disclosure, the four second control-objects generates an encirclement momentum towards the first control-object. Compared with FIG. 1, spatial-locations of the four NPCs do not overlap.

Thus, according to the disclosed embodiments of the present disclosure, in a game without physical collision, an effect of collision may also be simulated for monster encirclement, thereby making monster performance more truthful.

It should be noted that, according to the disclosed method embodiments, for brief descriptions, the method embodiments are described as a combination of a series of actions. However, a person skilled in the art should know that, the present disclosure is not limited by an action sequence that is described, because some steps may be performed in another sequence or simultaneously according to the present disclosure. Second, the person skilled in the art should also know that, all the embodiments described in the specification are preferable embodiments, and involved actions and modules are not necessarily required by the present disclosure.

Further, a person skilled in the art can know that the method according to the foregoing embodiments may be implemented by using software and a necessary general hardware platform, or certainly may be implemented by using hardware. However, in most cases, the former is a preferred implementation. Based on such an understanding, the technical solutions of the present disclosure essentially, or the part contributing to the existing technology may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of the present disclosure.

Figure 11:
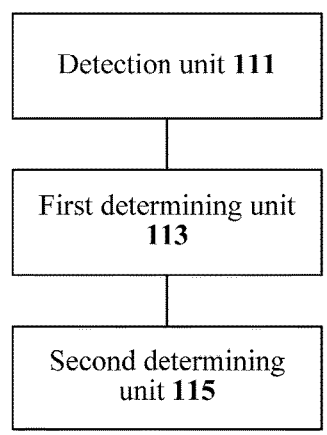
FIG. 11 illustrates a schematic diagram of a control-object spatial-location determining apparatus according to an embodiment of the present disclosure.

According to an embodiment of the present disclosure, an apparatus used for implementing the foregoing control-object spatial-location determining method is further provided, as shown in FIG. 11.

In this embodiment, the foregoing control-object spatial-location determining apparatus may be alternatively applied to the network environment shown in FIG. 2.

As shown in FIG. 11, the control-object spatial-location determining apparatus includes the following: a detection unit 111, a first determining unit 113, and a second determining unit 115.

The detection unit 111 is configured to detect a spatial-location request, where the spatial-location request is used for requesting to determine a second spatial-location of a second control-object according to a first spatial-location of a first control-object in the game application, and the game engine is an engine without physical collision. For example, control-objects in the game application are allowed to overlap at a spatial-location.

The first determining unit 113 is configured to determine multiple candidate spatial-locations according to the first spatial-location of the first control-object, where the multiple candidate spatial-locations surround the first spatial-location, and any two of the multiple candidate spatial-locations and the first spatial-location do not overlap.

The second determining unit 115 is configured to determine an unoccupied candidate spatial-location among the multiple candidate spatial-locations as the second spatial-location of the second control-object.

After the second spatial-location is determined, a notification carrying information about the second spatial-location is generated. After receiving the notification, AI (such as an artificial intelligence control unit) of the second control-object moves the second control-object to the second spatial-location.

The apparatus in the embodiment may be in the game engine of the game application, and the game engine may be located on a server corresponding to the game application.

Thus, for the game engine without physical collision, after a spatial-location request is detected, multiple candidate spatial-locations are determined according to a first spatial-location of a first control-object, and an unoccupied candidate spatial-location among the multiple candidate spatial-locations is determined as a second spatial-location of a second control-object. The multiple candidate spatial-locations in the foregoing embodiment surround the first spatial-location, and the any two of the multiple candidate spatial-locations and the first spatial-location do not overlap. Therefore, the unoccupied location is selected from the multiple spatial-locations as the second spatial-location of the second control-object. If there are multiple second control-objects, locations of the multiple second control-objects do not overlap. Thus, spatial-locations that do not overlap may be allocated for multiple second control-objects in a game engine without physical collision instead of a game engine with physical collision having high research and development costs and low running efficiency, resolving the problem that, in a game engine without physical collision, existing solutions for making multiple bodies not overlap at a spatial location often have low operational efficiency.

Both the first control-object and the second control-object may be game characters, or may be static bodies in a game. The second control-object may be an object controlled by artificial intelligence, and the spatial-location request is also generated by the artificial intelligence control unit of the second control-object. For example, the first control-object may be a game player, the second control-object may be an NPC, and the game player may be a game character that is controlled by a user by entering an operation instruction when the user uses a game client.

Thus, even without physical collision, different spatial-locations in game application space are allocated for multiple NPCs, and the spatial-locations of the NPCs are different from each other, so that AI can make location occupying performance of the NPCs more truthful and vivid by using the encirclement mechanism.

In certain embodiments, the first determining unit may include: a determining module, configured to determine multiple candidate spatial-locations in a spatial region with the first spatial-location as the center, where a distance between each of the candidate spatial-locations and the first spatial-location does not exceed a preset threshold.

If a circular spatial region is determined by using the first spatial-location as the center and the preset threshold as the radius and the multiple candidate spatial-locations are randomly disposed in the circular spatial region, a distance between each of the candidate spatial-locations and the first spatial-location does not exceed the preset threshold, and the multiple candidate spatial-locations surround the first spatial-location.

In the game application, the second control-object needs to perform an operation (such as encirclement or attacking) on the first control-object. Therefore, an encirclement or attacking function of a game may be implemented better if a distance between a candidate spatial-location and the first spatial-location is determined to be within a range of a preset distance.

In some embodiments, the determining module may include: a disposition sub-module, configured to dispose, in the spatial region, the multiple candidate spatial-locations on an encirclement ring with the first spatial-location as the center.

Specifically, there are N encirclement rings. The disposition sub-module includes: a first location disposition sub-module, configured to dispose one group of candidate spatial-locations on each of the N encirclement rings, where an $i^{th}$ group of candidate spatial-locations is disposed on an $i^{th}$ encirclement ring, N is an integer greater than or equal to 1, and i is a positive integer less than or equal to N.

N encirclement rings may be disposed by using the first spatial-location as the center of a circle. The radius of each encirclement ring is different. One group of candidate spatial-locations is disposed on each encirclement ring, that is, an $i^{th}$ group of candidate spatial-locations is disposed on an $i^{th}$ encirclement ring. In this way, randomness of disposing the candidate spatial-locations is reduced, and performance of a processor is improved. In addition, a distance between candidate spatial-locations on each encirclement ring is consistent, and a second spatial-location may be selected for the encirclement rings one after another. For example, a candidate spatial-location on a first encirclement ring is selected first, and if there is no proper location on the first encirclement ring, a location on a second encirclement ring is selected; and so on. Compared with random disposition of candidate spatial-locations, in this solution, disposition of candidate spatial-locations complies with a rule, and so does selection of candidate spatial-locations, thereby increasing the processing speed.

Further, when the candidate spatial-locations are disposed, the $i^{th}$ group of candidate spatial-locations is evenly disposed on the $i^{th}$ encirclement ring, and a number of candidate spatial-locations in each group is different from each other.

In some embodiments, the $i^{th}$ group of candidate spatial-locations may be alternatively unevenly distributed on the $i^{th}$ encirclement ring, and the number of candidate spatial-locations in each group may be the same.

It should be noted that, in the present disclosure, an encirclement ring is only a virtual concept, candidate spatial-locations may be disposed according to a radius distance, and the encirclement ring may not be disposed. That is, N groups of candidate spatial-locations are disposed according to different radius distances by using the first control-object as the center, and distances between candidate spatial-locations and the first control-object may be the same in each group.

In some embodiments, the disposition sub-module includes: a second location disposition sub-module, configured to set at least one of the following according to attribute information of the first control-object and the second control-object: the distance between the $i^{th}$ encirclement ring and the first control-object, the number of candidate spatial-locations in the $i^{th}$ group, and the distribution manner of the $i^{th}$ group of candidate spatial-locations.

In one embodiment, the number of encirclement rings, the distance between each encirclement ring and the first control-object, the number of candidate spatial-locations in each group, and the distribution manner (such as even distribution or uneven distribution) of candidate spatial-locations may be determined according to attributes of the first control-object and the second control-object.

When candidate spatial-locations are disposed, the connection between each of the multiple candidate spatial-locations and the first spatial-location of the target object (that is, the first control-object) does not coincide with each other, so that an NPC object located at each candidate spatial-location may directly perform an operation on the target object, that is, each candidate spatial-location is set to be a location at which an operation may be directly performed on the target object.

Further, when the second spatial-location is determined, the second spatial-location may be selected according to a predefined priority selection manner. For example, the selection manner of first selecting the one whose distance is the shortest, or the selection manner of selecting the one whose distance from a neighboring candidate spatial-location is the largest. The predefined priority selection manner may be alternatively self-defined according to a service requirement. Generally, a principle of first selecting the one whose distance is the shortest may be complied with, that is, an encirclement point relatively close to the target object and closest to a current location of an NPC on an encirclement ring is allocated for the NPC (such as a monster).

That is, a location selection module included in the second determining unit is configured to determine an unoccupied candidate spatial-location among the multiple candidate spatial-locations and closest to the first spatial-location as the second spatial-location of the second control-object.

Specifically, after the first spatial-location is determined, an encirclement ring closest to the first spatial-location is obtained, and an unoccupied candidate spatial-location is selected from the currently obtained encirclement ring. If all candidate spatial-locations on the currently obtained encirclement ring are occupied, a next closest encirclement ring is obtained, and the rest is deduced by analogy, until the occupied encirclement ring is found.

Further, each candidate spatial-location may have a status flag. The status flag is used for indicating whether the candidate spatial-location is occupied, that is, whether the corresponding candidate spatial-location is occupied may be determined according to the status flag. After the unoccupied candidate spatial-location among the multiple candidate spatial-locations and closest to the first spatial-location is determined as the second spatial-location of the second control-object, a status of the unoccupied candidate spatial-location among the multiple candidate spatial-locations and closest to the first spatial-location is changed to an occupied state by using a state change unit.

In one embodiment, the detection unit includes: a first detection module, configured to: determine that the spatial-location request is detected when receiving an instruction of an operation performed by the second control-object on the first control-object; or a second detection module, configured to: determine that the spatial-location request is detected if it is detected that the first control-object moves to the first spatial-location and a distance between the first spatial-location and a third spatial-location exceeds a preset distance in a case in which the first control-object is located at the third spatial-location and the first control-object is surrounded by multiple second control-objects located at a fourth spatial-location. The foregoing are two trigger conditions for triggering generation of a spatial-location request.

In some embodiments, the second detection module is further configured to: determine a motion vector of the first control-object based on the first spatial-location and the third spatial-location if it is detected that the first control-object moves to the first spatial-location and the distance between the first spatial-location and the third spatial-location does not exceed the preset distance; and translationally move the second control-object from the second spatial-location to a fifth spatial-location according to the motion vector.

The encirclement target is not necessarily static, and when the target continuously moves, an entire "formation" continuously and translationally moves based on the target, that is, absolute coordinates of each encirclement point continuously change. Therefore, after the NPC obtains an encirclement point by means of applying, the AI needs to continuously determine current coordinates of the encirclement point, and if finding that the NPC deviates from the encirclement point by a relatively large margin, the AI initiates movement of the NPC to new coordinates. In addition, if one-off movement of the target causes deviation from original coordinates by a relatively large margin (such as the state shown in FIG. 9), resulting in a relatively large change of a relative location of the NPC in the encirclement, all encirclement points may be reset at the same time, so that the NPC initiates applying again.

Further, in a game without physical collision, an effect of collision may also be simulated for monster encirclement, thereby making monster performance more truthful.

The modules provided in the present disclosure may use methods provided in corresponding method embodiments, and application scenarios may also be the same. Certainly, it should be noted that, the solution related to the modules may be not limited to the content and scenarios in the disclosed embodiments, and the modules may be run in a computer terminal or a mobile terminal, and may be implemented by using software or hardware.

According to an embodiment of the present disclosure, a server used for implementing the foregoing control-object spatial-location determining method is further provided.

Figure 12:
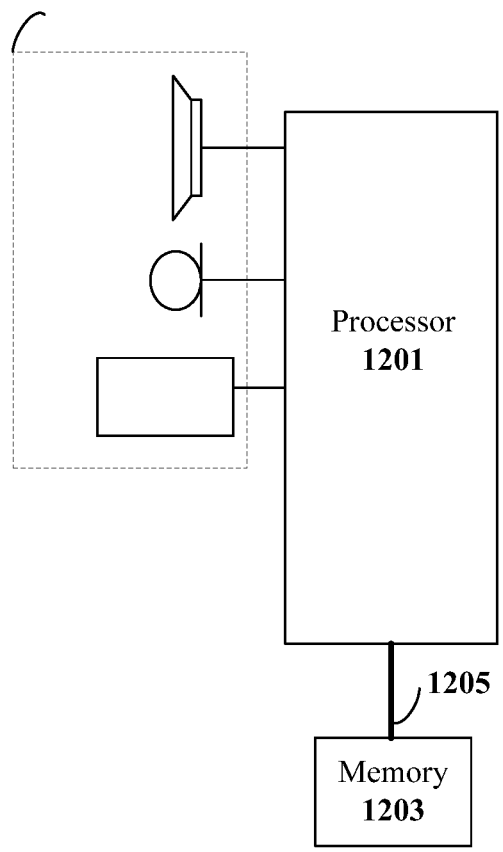
FIG. 12 illustrates an internal structural block diagram of a server according to an embodiment of the present disclosure.

As shown in FIG. 12, the server includes: one or more (only one is shown in the figure) processors 1201, a memory 1203, and a transmission apparatus 1205. As shown in FIG. 12, the terminal may further include an input/output device 1207.

The memory 1203 may be configured to store a software program and a module such as a program instruction/module corresponding to the control-object spatial-location determining method and apparatus in the embodiments of the present disclosure, and the processor 1201 runs the software program and the module stored in the memory 1203, so as to execute various function applications and data processing, that is, to implement the control-object spatial-location determining method. The memory 1203 may include a high-speed random-access memory, and may also include a nonvolatile memory such as one or more magnetic storage devices, a flash memory, or another nonvolatile solid-state memory. In some embodiments, the memory 1203 may further include memories remotely disposed relative to the processor 1201, and these remote memories may be connected to the terminal through a network. Instances of the network include, but are not limited to, the Internet, an intranet, a local area network, a mobile communications network, and a combination thereof.

The transmission apparatus 1205 is configured to receive or send data by using a network, and may be further configured to transmit data between a processor and a memory. Specific examples of the foregoing network may include a wired network and a wireless network. In an example, the transmission apparatus 1205 includes a network interface controller (NIC) that may be connected to another network device and a router by using a network cable, thereby communicating with the Internet or a local area network. In an example, the transmission apparatus 1205 is a radio frequency (RF) module that is configured to communicate with the Internet in a wireless manner.

Specifically, the memory 1203 is configured to store an application program. The processor 1201 may invoke the application program stored in the memory 1203, so as to perform the following method.

S1: A game engine of a game application detects a spatial-location request, where the spatial-location request is used for requesting to determine a second spatial-location of a second control-object according to a first spatial-location of a first control-object in the game application, and the game engine is an engine without physical collision. For example, control-objects in the game application are allowed to overlap at a spatial-location.

S2: The game engine determines multiple candidate spatial-locations according to the first spatial-location of the first control-object, where the multiple candidate spatial-locations surround the first spatial-location, and any two of the multiple candidate spatial-locations and the first spatial-location do not overlap.

S3: The game engine determines an unoccupied candidate spatial-location among the multiple candidate spatial-locations as the second spatial-location of the second control-object.

The processor 1201 may invoke the application program stored in the memory 1203, so as to perform the followings: determining the multiple candidate spatial-locations in a spatial region with the first spatial-location as the center, where a distance between each of the candidate spatial-locations and the first spatial-location does not exceed a preset threshold.

Thus, for the game engine without physical collision, after a spatial-location request is detected, multiple candidate spatial-locations are determined according to a first spatial-location of a first control-object, and an unoccupied candidate spatial-location among the multiple candidate spatial-locations is determined as a second spatial-location of a second control-object. The multiple candidate spatial-locations in the foregoing embodiment surround the first spatial-location, and the any two of the multiple candidate spatial-locations and the first spatial-location do not overlap. Therefore, the unoccupied location is selected from the multiple spatial-locations as the second spatial-location of the second control-object. If there are multiple second control-objects, locations of the multiple second control-objects do not overlap. Thus, spatial-locations that do not overlap may be allocated for multiple second control-objects in a game engine without physical collision instead of a game engine with physical collision having high research and development costs and low running efficiency, resolving the problem that, in a game engine without physical collision, existing solutions for making multiple bodies not overlap at a spatial location often have low operational efficiency.

A person of ordinary skill in the art may understand that, the structure shown in FIG. 12 is only exemplary for the server, and the structure may also be applied to a terminal device such as a smartphone (such as an Android mobile phone or an iOS mobile phone), a tablet computer, a palmtop computer, and a mobile Internet device (MID), or a PAD. FIG. 12 does not limit the specific structure. For example, the server and/or terminal may further include more or less components (such as a network interface and a display apparatus) than those shown in FIG. 12, or have configuration different from that shown in FIG. 12.

The person of ordinary skill in the art may understand that all or some of the steps in the methods of the foregoing embodiments may be implemented by a program instructing related hardware. The program may be stored in a computer readable storage medium. The storage medium may include: a flash drive, a read-only memory (ROM), a random-access memory (RAM), a magnetic disk, an optical disc, or the like.

This embodiment of the present disclosure further provides a storage medium. In some embodiments, the foregoing storage medium may be used for storing program code for performing the control-object spatial-location determining method.

In some embodiments, the foregoing storage medium may be located in at least one of multiple network devices in the network shown in FIG. 2.

In some embodiments, the storage medium is configured to store program code used by the processor to perform the following method.

S1: A game engine of a game application detects a spatial-location request, where the spatial-location request is used for requesting to determine a second spatial-location of a second control-object according to a first spatial-location of a first control-object in the game application, and the game engine is an engine without physical collision. For example, control-objects in the game application may overlap at a spatial-location.

S2: The game engine determines multiple candidate spatial-locations according to the first spatial-location of the first control-object, where the multiple candidate spatial-locations surround the first spatial-location, and any two of the multiple candidate spatial-locations and the first spatial-location do not overlap.

S3: The game engine determines an unoccupied candidate spatial-location among the multiple candidate spatial-locations as the second spatial-location of the second control-object.

In some embodiments, the storage medium is further configured to store program code used by the processor to perform the following: determining the multiple candidate spatial-locations in a spatial region with the first spatial-location as the center, where a distance between each of the candidate spatial-locations and the first spatial-location does not exceed a preset threshold.

Thus, for the game engine without physical collision, after a spatial-location request is detected, multiple candidate spatial-locations are determined according to a first spatial-location of a first control-object, and an unoccupied candidate spatial-location among the multiple candidate spatial-locations is determined as a second spatial-location of a second control-object. The multiple candidate spatial-locations in the foregoing embodiment surround the first spatial-location, and the any two of the multiple candidate spatial-locations and the first spatial-location do not overlap. Therefore, the unoccupied location is selected from the multiple spatial-locations as the second spatial-location of the second control-object. If there are multiple second control-objects, locations of the multiple second control-objects do not overlap. Thus, spatial-locations that do not overlap may be allocated for multiple second control-objects in a game engine without physical collision instead of a game engine with physical collision having high research and development costs and low running efficiency, resolving the problem that, in a game engine without physical collision, existing solutions for making multiple bodies not overlap at a spatial location often have low operational efficiency.

In some embodiments, the storage medium may include but is not limited to various mediums that can store program code, for example, a USB disk, a ROM, a RAM, a mobile disk, a magnetic disk, and an optical disc.

When being implemented in a form of software functional unit and sold or used as independent products, the integrated units in the foregoing embodiments may be stored the foregoing computer-readable storage medium. Computer software is stored in a storage medium, and includes several instructions used to make one or more computer devices (which may be a personal computer, a server, a network device, or the like) perform all or some steps of the method in the embodiments of the present disclosure.

In the several embodiments provided in the present application, it should be understood that the disclosed apparatus may be implemented in other manners. The apparatus embodiments described in the foregoing are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic or other forms.

The above descriptions are merely preferred embodiments of the present disclosure, and it should be noted that, a person of ordinary skill in the art may make various improvements and refinements without departing from the spirit of the present disclosure. All such modifications and refinements should also be intended to be covered by the present disclosure.

What is claimed is:

1. A method of determining a location of an attacker object relative to a target object in a game application, comprising:
    detecting, by a game engine of the game application, a location request;
    upon receipt of the location request, allocating, by the game engine, a first ring and a second ring, wherein the first ring is positioned between the second ring and the target object;
    allocating, by the game engine, at least two first candidate locations on the first ring, wherein the at least two first candidate locations do not touch each other, do not touch the second ring, but each touch the first ring;
    allocating, by the game engine, at least two second candidate locations on the second ring, wherein the at least two second candidate locations do not touch each other, do not touch the first ring, but each touch the second ring;
    upon determining a preset condition is met, selecting, by the game engine, one of the at least two first candidate locations as the location of the attacker object; and
    upon determining the preset condition is not met, selecting, by the game engine, one of the at least two second candidate locations as the location of the attacker object.

2. The method according to claim 1, wherein the one of the at least two first candidate locations and the target object does not exceed a preset threshold.

3. The method according to claim 1, further comprising:
    allocating, by the game engine, N number of rings, wherein the N number of rings includes the first ring, the second ring, and an $i^{th}$ ring, and N is a positive integer; and allocating, by the game engine, i number of candidate locations on the $i^{th}$ ring, wherein i is a positive integer less than or equal to N.

4. The method according to claim 3, wherein the i number of candidate locations are evenly distributed on the $i^{th}$.

5. The method according to claim 3, further comprising:
according to attribute information of the target object and the attacker object, setting at least one of: a distance between the $i^{th}$ ring and the target object, a size of the number i, and a distribution manner of the i number of candidate locations on the $i^{th}$ ring.

6. The method according to claim 1, further comprising:
assigning the one of the at least two first candidate locations an occupied state.

7. The method according to claim 1, wherein the detecting the location request comprises:
determining that the location request is detected upon receiving an instruction of an operation performed by the attacker object on the target object; or
determining that the location request is detected upon detecting that the target object moves a distance and the distance.

8. The method according to claim 7, further comprising:
determining a motion vector of the target object upon detecting the distance does not exceed the preset distance; and
according to the motion vector, moving the one of the at least two first candidate locations.

9. The method according to claim 1, wherein the at least two first candidate locations are of a first number, and the at least two second candidate are of a second number different than the first number.

10. A location determining apparatus for a game application, comprising: a memory storing computer-readable instructions; and a processor coupled to the memory and, upon executing the instructions, configured to perform:
detecting a location request;
upon receipt of the location request, allocating a first ring and a second ring, wherein the first ring is positioned between the second ring and the target object;
allocating at least two first candidate locations on the first ring, wherein the at least two first candidate locations do not touch each other, do not touch the second ring, but each touch the first ring;
allocating, by the game engine, at least two second candidate locations on the second ring, wherein the at least two second candidate locations do not touch each other, do not touch the first ring, but each touch the second ring;
upon determining a preset condition is met, selecting, by the game engine, one of the at least two first candidate locations as the location of the attacker object; and
upon determining the preset condition is not met, selecting, by the game engine, one of the at least two second candidate locations as the location of the attacker object.

11. The apparatus according to claim 10, wherein a distance between the one of the at least two first candidate locations and the target object does not exceed a preset threshold.

12. The apparatus according to claim 10, wherein the processor is further configured to perform:

allocating, by the game engine, N number of rings, wherein the N number of rings includes the first ring, the second ring, and an $i^{th}$ ring, and N is a positive integer; and
allocating, by the game engine, i number of candidate locations on the $i^{th}$ ring, wherein i is a positive integer less than or equal to N.

13. The apparatus according to claim 12, wherein:
the i number of candidate locations are evenly distributed on the $i^{th}$; and
the processor is further configured to perform: according to attribute information of the target object and the attacker object, setting at least one of: a distance between the $i^{th}$ ring and the target object, and a distribution manner of the i number of candidate locations on the $i^{th}$ ring.

14. A non-transitory computer-readable storage medium containing computer-executable instructions, upon being executed by a processor to perform:
detecting a location request;
upon receipt of the location request, allocating a first ring and a second ring, wherein the first ring is positioned between the second ring and the target object;
allocating at least two first candidate locations on the first ring, wherein the at least two first candidate locations do not touch each other, do not touch the second ring, but each touch the first ring;
allocating at least two second candidate locations on the second ring, wherein the at least two second candidate locations do not touch each other, do not touch the first ring, but each touch the second ring;
upon determining a preset condition is met, selecting one of the at least two first candidate locations as the location of the attacker object; and
upon determining the preset condition is not met, selecting, by the game engine, one of the at least two second candidate locations as the location of the attacker object.

15. The non-transitory computer-readable storage medium according to claim 14, wherein a distance between the one of the at least two first candidate locations and the target object does not exceed a preset threshold.

16. The non-transitory computer-readable storage medium according to claim 14, wherein the computer-executable instructions are executed by the processor to further perform:
allocating, by the game engine, N number of rings, wherein the N number of rings includes the first ring, the second ring, and an $i^{th}$ ring, and N is a positive integer; and
allocating, by the game engine, i number of candidate locations on the $i^{th}$ ring, wherein i is a positive integer less than or equal to N.

17. The non-transitory computer-readable storage medium according to claim 16, wherein:
the i number of candidate locations are evenly distributed on the $i^{th}$ ring; and
the computer-executable instructions are executed by the processor to further perform:
according to attribute information of the target object and the attacker object, setting at least one of: a distance between the $i^{th}$ ring and the target object, a size of the number i, and a distribution manner of the i number of candidate locations on the $i^{th}$ ring.

* * * * *